9887X
T. MILLER.
Plow.
Patented July 2. 1836.
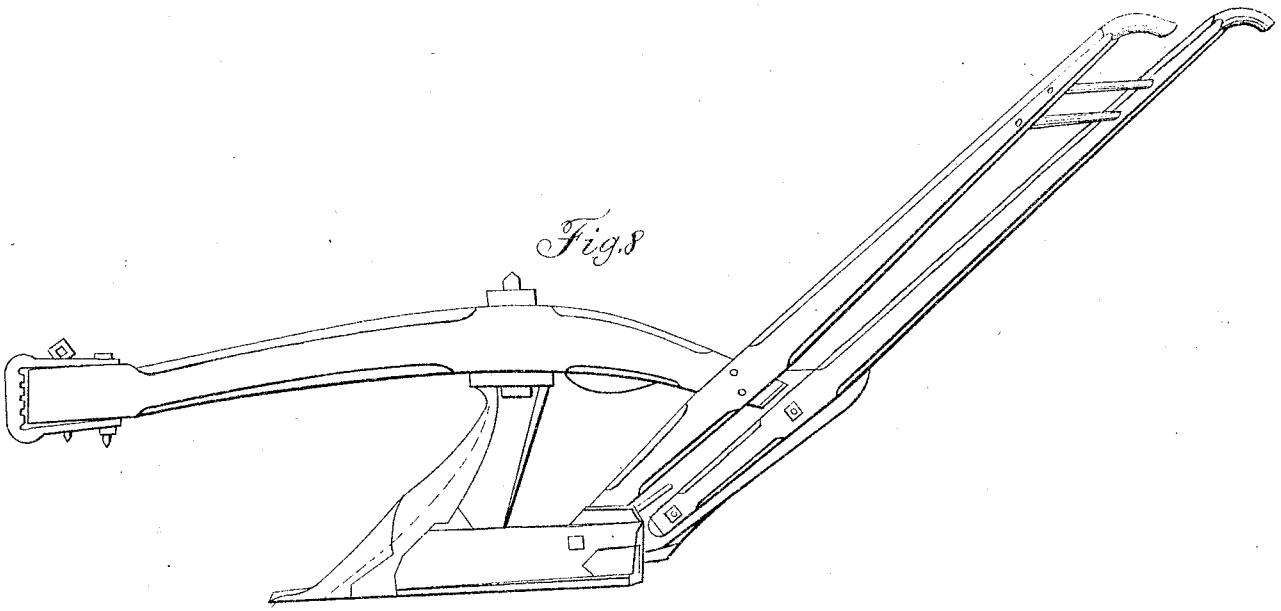

9887X

UNITED STATES PATENT OFFICE.

TIMOTHY MILLER, OF PITTSBURG, PENNSYLVANIA.

IMPROVEMENT IN PLOWS.

Specification forming part of Letters Patent dated July 2, 1836.

*To all whom it may concern:*

Be it known that I, TIMOTHY MILLER, of the city of Pittsburg, county of Allegheny, and State of Pennsylvania, have invented a new and useful Improvement in Agricultural Plows; and I do hereby declare that the following is a full and exact description thereof.

Figure 1, A is the furrow side of the mold-board, with the share placed thereon, and forms a regular twist from point to heel, so that when the earth has been by the edge of the share cut it will regularly rise and cast over, with the fresh earth uppermost, and this twist is confined between the lower edge of the mold-board and the line B. C is a cutting-edge, which constitutes a part of the mold-board, and rises straight or perpendicular from the line B to the cutting-edge D, and the same surface and rise to continue up to the lower side of the plow-beam, and which said rise has a lateral and regular curve from near the point of the colter or share until it terminates at 2. This colter has a convex curve on the land side, which terminates in a sharp edge, that is called the "cutter," at D. The edge D, before mentioned and partly described, is to be nearly upon a straight line from 3 to 4, allowing a slight regular rise or curve between these points, and from 4 to the top at the beam to rise in a quick concave curve, continuing and preserving the edge to the beam-plate, which supports the beam.

Fig. 2 represents the landside of the mold-board, or, as may be termed, the "back" or "inside." E is the beam-plate, and as made belongs to the before-described casting, and is of the width on top to correspond with the thickness of the beam, so as to give a sufficient bearing and a requisite strength; F, the screw-bolt that passes through the cap E and the plow-beam, so as to connect the beam to the mold-board, the bolt to be put in from the under side, and the lightening-bar on the beam C is a rib or bar cast to the back of the mold-board and connects with the cap E, and is brought flush to the edge and extends down near to the lower edge of the mold-board, where it terminates at a point. This gives strength to the cap and mold-board. 5 5 are bolt-holes with countersunk heads, through which are put to fasten the mold-board to the handle. The dotted lines show the landside H, (an outside view of the landside.) The landside is cast in the usual way to the mold-board, with a stiffening-bar at the heel. I is a small casting, which is made to fit in a recess left in the landside, having a tongue on the inside, that passes through a mortise left in the landside, and is made fast together with by a small key.

Fig. 3 is an end view of the landside. This may be taken off and replaced with another when worn out. The landside is raised from the sole perpendicular to the line 6, and that line to 7. There is a regular curvature to prevent the dirt from falling over in the plow. 8 is the sole, which is a flange on the bottom of the landside; 9, a hole to receive a screw-bolt with a countersunk head, which connects the beam-handle to the landside.

Fig. 4 gives an inside view of the landside. 10 is a small projection upon which the end of the beam-handle rests; 11, a flange or bar made in casting to strengthen.

Fig. 5 exhibits a view of the mold-board without the share. K is a recess sunk sufficiently to receive the share, that laps upon the mold-board so as to form an even surface on the face. 12 12 are grooves. 13 is a countersunk hole.

Fig. 6 is the lower side view of the share L. 14 14 are bars which fit into the grooves 12 and 12. 15 is a projection that fits in 13. L is a top view of the share and so much of the cutter from 3 to 17. 16 is a bolt-hole, which receives a screw-bolt with a countersunk head, and passing through share and mold-board with the nut below that fastens the share to the mold-board.

Fig. 7 represents a share with a common sword or cutter connected with the share, the share in other respects to be made as the one already described, which may be made use of on those plows.

Fig. 8 exhibits a perspective view of the plow. The handles and beam are connected together in the usual and common way. The clevis, &c., are also made and placed on the beam as others.

The plow is intended for the usual agricultural purposes, &c.

What I claim as my own invention, and not previously known in the above-described machine, is—

The convex curvature on the outside of the landside (see Fig. 3) from 6 to 7; also, the bar on the inside of the landside, (marked 11;) also, the grooves in the mold-board, (marked 12 12;) also, the countersunk hole in the mole-board, (marked 13;) also, the bars, (marked 14 14,) on the share, Fig. 6, and the projection 15, all of which are made to fit in 12 12 and 13; also, the rib or bar cast to the back of mold-board and connected with E, (marked G.)

TIMOTHY MILLER.

Witnesses:

JOHN C. NELSON,

JACOB STROOP.